United States Patent
Suh et al.

(10) Patent No.: US 7,746,802 B2
(45) Date of Patent: Jun. 29, 2010

(54) METHOD AND APPARATUS FOR CHANNEL STATE FEEDBACK USING ARITHMETIC CODING

(75) Inventors: Chang-Ho Suh, Seoul (KR); Seok-Hyun Yoon, Seoul (KR); Dong-Seek Park, Yongin-si (KR); Young-Kwon Cho, Suwon-si (KR); Dipankar Raychaudhuri, Piscataway, NJ (US); Leonid Razoumov, Piscataway, NJ (US)

(73) Assignees: Samsung Electronics Co., Ltd. (KR); WINLAB, Rutgers University, Piscataway, NJ (US)

( * ) Notice: Subject to any disclaimer, the term of this patent is extended or adjusted under 35 U.S.C. 154(b) by 1324 days.

(21) Appl. No.: 11/140,878

(22) Filed: May 31, 2005

(65) Prior Publication Data

US 2005/0265436 A1     Dec. 1, 2005

Related U.S. Application Data

(60) Provisional application No. 60/575,924, filed on Jun. 1, 2004.

(51) Int. Cl.
  *H04L 12/28* (2006.01)
  *G01R 31/08* (2006.01)
  *H04W 4/00* (2009.01)
  *H04B 17/02* (2006.01)
  *H03C 1/62* (2006.01)

(52) U.S. Cl. .................. 370/252; 370/332; 370/395.21; 455/135; 455/115.3

(58) Field of Classification Search .................. 370/203, 370/204, 208, 209, 252, 465, 480, 481, 482, 370/483; 375/260, 296, 221, 259, 377, 316, 375/358, 148

See application file for complete search history.

(56) References Cited

U.S. PATENT DOCUMENTS 6,154,489 A * 11/2000 Kleider et al. ............... 375/221
6,240,282 B1 * 5/2001 Kleider et al. ........... 455/226.1

(Continued)

FOREIGN PATENT DOCUMENTS

KR      10-0697533      3/2007

OTHER PUBLICATIONS

Yichuan Wu et al., "Adaptive Robust Header Compression Based on RTS/CTS Handshake for Real-Time Streams in 3G Wireless Network", 2004.

*Primary Examiner*—Hanh Nguyen
(74) *Attorney, Agent, or Firm*—The Farrell Law Firm, LLP

(57) ABSTRACT

Disclosed are the design and implementation of a CSI feedback channel in a multi-carrier wireless communication system. An apparatus and a method for channel state feedback using arithmetic coding are provided to ensure efficiency and reliability of a system by transmitting the CSI while compressing the CSI with a predetermined compression rate selected depending on a channel state. The apparatus for CSI feedback in a wireless communication system performing channel estimation at a transmitter or a receiver by using a communication channel includes a transmitter terminal transmitting a signal for CSI measurement by using the communication channel, and a receiver terminal receiving the signal from the transmitter terminal, checking a channel state based on the received signal, and transmitting the signal to the transmitter terminal after compressing the signal according to the channel state.

17 Claims, 5 Drawing Sheets

U.S. PATENT DOCUMENTS

| | | | |
|---|---|---|---|
| 6,473,467 B1 * | 10/2002 | Wallace et al. | 375/267 |
| 7,154,936 B2 * | 12/2006 | Bjerke et al. | 375/148 |
| 7,164,649 B2 * | 1/2007 | Walton et al. | 370/203 |
| 7,339,881 B1 * | 3/2008 | Abousleman et al. | 370/203 |
| 7,417,568 B2 * | 8/2008 | Fallon et al. | 341/51 |
| 2003/0003880 A1 * | 1/2003 | Ling et al. | 455/92 |
| 2003/0036359 A1 * | 2/2003 | Dent et al. | 455/63 |
| 2003/0169769 A1 * | 9/2003 | Ho et al. | 370/473 |
| 2004/0253960 A1 * | 12/2004 | Nguyen et al. | 455/450 |
| 2005/0058095 A1 * | 3/2005 | Sadri et al. | 370/329 |
| 2008/0013638 A1 * | 1/2008 | Walton et al. | 375/260 |

* cited by examiner

METHOD AND APPARATUS FOR CHANNEL STATE FEEDBACK USING ARITHMETIC CODING

PRIORITY

This application claims priority to an application entitled "Method and Apparatus For Channel State Feedback Using Arithmetic Coding" filed with the US Patent and Trademark Office on Jun. 1, 2004 and assigned Provisional Application No. 60/575,924, the contents of which are incorporated herein by reference.

BACKGROUND OF THE INVENTION

1. Field of the Invention

The present invention relates to transmission/reception of channel state information (CSI) in a multi-carrier wireless communication system, and more particularly to a design and implementation of a CSI feedback channel in a multi-carrier wireless communication system.

2. Description of the Related Art

With the development of cellular type wireless mobile telecommunication systems in the U.S. toward the end of the 1970's, voice communication service is provided to users through an advanced mobile phone service (AMPS) system, which is a $1^{st}$ generation (1G) analog type mobile communication system. A $2^{nd}$ generation (2G) mobile communication system called a "Code Division Multiple Access (CDMA) system" followed in the—1990's to provide users with voice and low-speed data services.

An IMT-2000 (International Mobile Telecommunication-2000), which is a $3^{rd}$ generation (3G) mobile communication system, has been researched at the end of the 1990's to provide improved wireless multimedia services, international roaming, and high-speed data services. Recently, IMT-2000 services have been partially provided to users to transmit high-speed data and accommodate the increase of data in modern mobile communication systems. To do so, the 3G mobile communication system uses a packet service communication system. Packet service communication systems can transmit burst packet data to a plurality of mobile stations, so it is adaptable for transmitting mass-storage data.

In short, the packet service communication system has been developed to provide high-speed packet services. For instance, a high-speed downlink packet access (HSDPA) scheme suggested by the 3GPP ($3^{rd}$ Generation Partnership Project), which is a consortium for providing standards for $3^{rd}$ generation asynchronous mobile communication systems, adopts an adaptive modulation and coding (AMC) scheme, a hybrid automatic retransmission request (HARQ) scheme, and a fast cell select (FCS) scheme to support high-speed packet data transmission.

Hereinafter, the AMC scheme will be described as an example of high-speed packet service schemes.

The AMC scheme is a data transmission scheme capable of improving cell efficiency by selecting the channel modulation scheme and the coding scheme according to the channel status between a base station and a mobile station. According to the AMC scheme, a plurality of modulation schemes are incorporated with a plurality of coding schemes to perform modulation and coding for channel signals. Generally, a set of the modulation scheme and the coding scheme is called a "Modulation and Coding Scheme (MCS)", and a level (1 to N) of the MCS can be determined according to the number of MCSs. That is, according to the AMC scheme, the level of the MCS is adaptively determined depending on the channel status between the mobile station and the base station, thereby improving a system efficiency of the base station. In addition, the AMC scheme, HARQ scheme, and FCS scheme can be used not only for the HSDPA scheme, but also for various high-speed data transmission schemes.

The 3G mobile communication system has evolved into a $4^{th}$ generation (4G) mobile communication system. The 4G mobile communication system is being standardized to provide an effective combination of a wired communication network and a wireless communication network and total services in addition to the wireless communication services provided by conventional communication systems. Thus, it is necessary to develop a technique capable of transmitting as much mass-storage data as a wired communication network through a wireless communication network.

To this end, an OFDM (Orthogonal Frequency Division Multiplexing) scheme has been actively studied to transmit high-speed data through wired/wireless channels in the 4G mobile communication systems. According to the OFDM scheme, a multi-carrier is used to transmit data. The OFDM scheme is a kind of an MCM (Multi Carrier Modulation) scheme, in which serial symbol arrays are converted into parallel symbol arrays, which are modulated into a plurality of sub-carriers, that is, a plurality of sub-carrier channels which are orthogonal to each other.

The basic idea of the above-mentioned communication systems is to effectively and reliably transmit data through a channel. A next-generation multimedia mobile communication system, requires a high-speed communication scheme capable of processing and transmitting various data types, such as images and wireless data, while simultaneously providing a basic voice service, so it is necessary to improve the efficiency of mobile communication systems by applying a proper coding technique.

However, this is extremely difficult as wireless communication systems are prone to errors from various factors, such as multipath interference, shadowing, wave attenuation, noise, interference, and fading, thereby causing information loss. Such an information loss may distort a transmission signal, causing performance degradation of the mobile communication system. Various studies and research have been conducted to reduce information loss and improve reliability of mobile communication systems by applying various techniques to the system according to the status of its channels.

SUMMARY OF THE INVENTION

Accordingly, the present invention has been made to solve the above-mentioned problems occurring in the prior art, and an object of the present invention is to provide an apparatus and a method concerning the design and implementation of a channel state information feedback channel in a multi-carrier wireless communication system.

Another object of the present invention is to provide an apparatus and a method for channel state feedback using arithmetic coding capable of reducing effects of imperfect channel state information upon system capacity in a mobile communication system.

Still another object of the present invention is to provide an apparatus and a method for channel state feedback using arithmetic coding capable of improving system performance by transmitting channel state information while varying a compression rate thereof depending on a status of a channel in a mobile communication system.

Still another object of the present invention is to provide an apparatus and a method for channel state feedback using arithmetic coding capable of ensuring efficiency and reliability of a system by transmitting channel state information while compressing the channel state information with a predetermined compression rate selected depending on a status of a channel in a mobile communication system.

In order to accomplish these objects, according to a first aspect of the present invention, there is provided an apparatus for channel state information (CSI) feedback in a wireless communication system performing channel estimation at a transmitter or a receiver by using a communication channel, the apparatus including: a transmitter terminal transmitting a signal for CSI measurement by using the communication channel; and a receiver terminal receiving the signal from the transmitter terminal, checking a channel state based on the received signal, and transmitting the signal to the transmitter terminal after compressing the signal according to the channel state. The communication channel includes a pilot channel or a traffic channel.

The receiver terminal includes a receiver for receiving a pilot channel and a traffic channel from the transmitter terminal, a CSI measurement unit for measuring a CSI value by using the pilot channel, and a CSI encoder for encoding reception data and compressing CSI data into CSI feedback channel frames.

The CSI encoder includes a channel measurement unit for measuring the CSI from an input signal, a channel gain quantizer for quantizing each channel gain based on the CSI value measured by the channel measurement unit, a multiplexer for multiplexing an output of the channel gain quantizer, an arithmetic encoder for compressing the CSI by using arithmetic coding, a frame section for converting compressed CSI data into CSI feedback channel frames, and a selector for selecting a CSI feedback channel frame having a predetermined compression rate corresponding to a channel state from among the CSI feedback channel frames.

The feedback channel frame includes a preamble and a frame body, the preamble has at least two fields including an Idx field having compression rate information and a length field having compression rate check information and the frame body includes a payload field having compressed feedback information and a cyclic redundancy check field for checking an occurrence of error.

The transmitter terminal includes a transmitter for transmitting the pilot channel and the traffic channel, and a CSI decoder for receiving and decoding a CSI feedback channel transmitted thereto from the receiver terminal.

In order to accomplish these objects, according to a second aspect of the present invention, there is provided a method for channel state information (CSI) feedback in a wireless communication system performing channel estimation at a transmitter or a receiver by using a communication channel, the method including the steps of: transmitting a data signal for CSI measurement by using the communication channel; and receiving the data signal from a transmitter terminal, checking a channel state based on the received data signal, and transmitting the data signal to the transmitter terminal after compressing the data signal according to the channel state. The communication channel includes a pilot channel or a traffic channel.

The compressing step includes the substeps of receiving a pilot channel and a traffic channel from the transmitter terminal and measuring a CSI value by using the pilot channel; and encoding reception data and compressing CSI data into CSI feedback channel frames.

The CSI data compression step includes the substeps of: measuring the CSI from an input signal and quantizing each channel gain based on the CSI value measured by the channel measurement unit; multiplexing quantized channel gains and compressing the CSI by using arithmetic coding; converting compressed CSI data into CSI feedback channel frames; and selecting a CSI feedback channel frame having a predetermined compression rate corresponding to a channel state from among the compressed CSI feedback channel frames.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
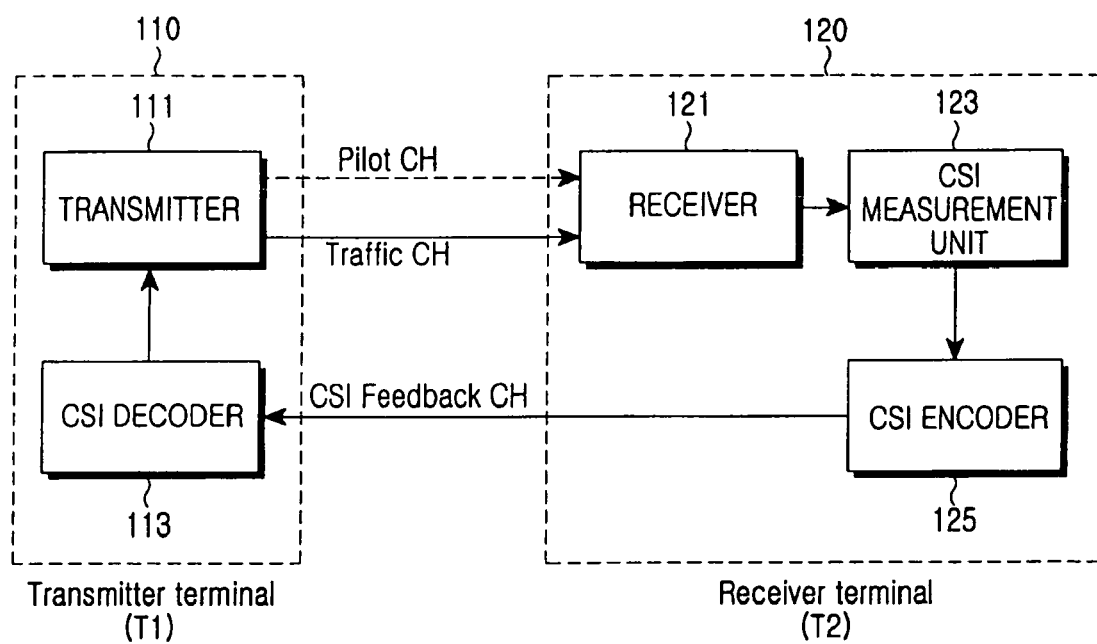
FIG. 1 is a block diagram illustrating a structure of a mobile communication system with channel state information feedback according to an embodiment of the present invention.

Hereinafter, embodiments of the present invention will be described with reference to the accompanying drawings.

In the following detailed description, representative embodiments of the present invention will be described. In addition, a detailed description of known functions and configurations incorporated herein will be omitted when it may make the subject matter of the present invention unclear.

The present invention described below relates to arithmetic code application for compressing channel state information (CSI) and arithmetic codes matched with channel state information models. In addition, a structure of a filter bank related to the arithmetic codes, a feedback frame format, and an operation of the filter bank in bi-directional communication terminals using the feedback frame format will be described below.

First, the filter bank will be described. A main function of a filter is to change relative amplitude in a predetermined frequency band of a signal. Such a function of the filter may depend on a frequency response of the filter. An ideal frequency selective filter allows only signals of desired frequency bands to pass therethrough. Such an ideal frequency selective filter includes a low-pass filter, a high-pass filter, a band-pass filter, and a band-stop filter. The filter bank is defined as a set of the above filters. Generally, the filter bank is classified into an analysis filter bank and a synthesis filter bank. The analysis filter bank divides an input signal x(n) into several signals having different frequency bands by using band-pass filters. The synthesis filter bank reproduces the input signal x(n) based on the several signals divided by the analysis filter bank. Thus, the filter bank can effectively process the signals. For instance, the analysis filter bank divides the input signal x(n) into signals having predetermined frequency bands so as to obtain important spectrum information of the input signal x(n). In addition, coding or processing is performed by means of the analysis filter bank through a down sampling procedure. Since most of important spectrum information can be obtained from the signals divided by the analysis filter bank, the signal is processed through coding in match with various application fields of signal compression, signal analysis and signal improvement.

The present invention relates to the design and implementation of a channel state information (CSI) feedback channel (FBCH) in a multi-carrier wireless communication system. The present invention described below relates to but not limited to an OFDM (Orthogonal Frequency Division Multiplexing) system and a multi-carrier CDMA (Code Division Multiple Access) system.

In a modern spectrally efficient multi-carrier wireless communication system, a transmitter Tx continuously adapts its power, coding and modulation to match time varying, and frequency selective characteristics of the wireless communication channel. To achieve this goal, a receiver Rx has to find a way to feed this CSI back to the transmitter. Performance of a communication link greatly depends on an accuracy and timely delivery of the CSI to the transmitter. Thus, transmission schemes for the CSI have been actively studied. One example of such transmission schemes is "Adaptive Wireless Transceivers: Turbo-coded, Turbo-Equalized and Space-Time Coded TDMA, CDMA, and OFDM systems" written by Hanzo, Wong and Yee in 2002.

Hereinafter, effects of an imperfect CSI upon system capacity will be described.

The effects of an imperfect CSI on system capacity are disclosed in "Fading Channels: Information-Theoretic And Communications Aspects" written by Ezio Biglieri, John Proakis and Shlomo Shamai in 1998, "The Effect Upon Channel Capacity In Wireless Communications Of Perfect And Imperfect Knowledge Of The Channel" written by Muriel Medard in 2000, and Fading Channels: How Perfect Need Perfect Side Information Be? written by Amos Lapidoth and Shlomo Shamai in 2002. Basically, an imperfect CSI degrades receiver performance.

The above documents show that channel capacity is reduced if an error occurs in CSI measurement and CSI feedback. "Fading Channels: "Information Theoretic And Communications Aspects" analyzes a frame error rate (FER) when a turbo code is used in a fading channel to analyze channel capacity. "Fading Channels: How Perfect Need Perfect Side Information Be?" analyzes a degree of CSI error allowance for enabling an operation of a system.

Muriel Medard defines system capacity as represented in Equation 1. It is possible to approximate information capacity of a symbol placed on a given sub-carrier by means of a Shannon-like "log" capacity formula with the effective SNR.

$$C = \frac{1}{2}\log(1 + SNR_{eff})$$  Equation 1 wherein, C is system capacity and SNR is defined as Equation 2.

$$SNR_{eff} = |\hat{g}|^2 E_s / (E_N + \sigma_g^2 E_s)$$

wherein, $E_s$ represents signal energy of a data symbol on a single sub-carrier, $E_N$ represents noise energy of a data symbol on a single sub-carrier, and $\sigma$ is a CSI error.

Thus, a receiver estimation error of 10% ($\sigma_g^2/|\hat{g}|^2=0.1$) limits maximum achievable SNR to 10 dB no matter how much power is input to Equations 2. That is, even if the receiver represents superior performance with no-noise, if a channel estimator of the receiver represents inferior performance, system performance will degrade. In addition, even if the channel estimator has superior performance, if an error occurs while transmitting channel values to the transmitter, system performance will degrade.

In addition, a cooperating transmitter has to match its per-sub-carrier transmitting power/rate assignments to values required by receiver decoding performance according to Equation 1. A typical scheme for adaptive transmission is based on the concept of power "water filling" which requires accurate knowledge of the CSI. In the above system, the transmitter transmits data based on channel information measured at the receiver, so the term "cooperating" is used for representing cooperation between the transmitter and the receiver.

That is, any error in transmitter assessment of the per-sub-carrier CSI will lead to deficiencies in spectrum utilization. For example, if CSI feedback mechanism has 3 dB of error per sub-carrier, the water filling calculation can be subject to 3 dB margin in order to offset the CSI uncertainty at the transmitter. This margin will double the radiated energy which, in turn, shortens battery life and doubles the interference inflicted upon other users.

Because of the multipaths present in all practically relevant terrestrial wireless links, the CSI of broadband communication systems has frequency selectivity. Thus, as bandwidth grows, the number of resolvable multipaths will increase. Consequently, the amount of the CSI being fed back to the transmitter grows as well. That is, as shown in Equation 1, if the CSI has the uncertainty, greater amount of CSI will be transmitted in order to improve the certainty of the CSI. In this case, the amount of information being fed back also increases at the same rate as the increase of the CSI, thereby degrading the system.

Feedbacking the CSI consumes system resources such as bandwidth, time and power. These problems become more severe in a multi-user environment because each user has to send the CSI back to the transmitting base station independently. For a broadband system with dozen of users served by a single base station, such an overhead on the uplink may cost a substantial fraction of the uplink capacity and can become a limiting factor in system performance.

The present invention decreases the amount of the CSI feedback traffic in a wireless network based on the following conditions.

That is, the present invention utilizes known statistical properties of the communication wireless channel, such as the certainty and amount of the CSI, by employing powerful, yet simple, arithmetic coding to compress the CSI before transmission. Feedback traffic is reduced by compressing and storing the feedback traffic without degrading the feedback quality.

Hereinafter, an apparatus and method for CSI feedback using arithmetic coding according to the present invention will be described with reference to accompanying drawings.

FIG. 1 is a block diagram illustrating the structure of the mobile communication system with channel state information feedback according to one embodiment of the present invention. In FIG. 1, channel estimation is carried out by using a pilot channel or a traffic channel, and the CSI is measured through the pilot channel.

Referring to FIG. 1, a transmitter terminal (T1) 110 transmits data to a receiver terminal (T2) 120 using a traffic channel or a pilot channel. At this time, the transmitter terminal 110 transmitting data to the receiver terminal 120 through the traffic channel further transmits information for CSI measurement to the receiver terminal 120 by using the pilot channel. The pilot channel is preferably transmitted by the transmitter terminal 110 in order to assist the receiver terminal 120 in CSI measurements. Thus, the receiver terminal 120 receives and decodes the data as well as measures the instantaneous value of the CSI in a CSI measurement unit 123 by using the pilot channel. Then, the receiver terminal 120 encodes and compresses CSI data into CSI feedback channel frames and sends the CSI data back to the transmitter terminal 110.

The procedure of actual CSI measurement at the receiver terminal 120 is beyond the scope of the present invention, so it will not be further described below. The present invention can successfully operate with any method of real-time CSI measurement. For illustration purposes only, three possible approaches to real-time measurement, that is, pilot based CSI measurement, blind CSI measurement, and data assisted pilot based CSI measurement are defined below.

1. Pilot based CSI measurement: The CSI is measured by using predetermined values (pilots) which are preset in the transmitter terminal and receiver terminal. This is widely used in the communication system and represents superior performance.

2. Blind CSI measurement: The CSI is measured by using traffic data only without transmitting predetermined values (pilots). Since the predetermined values are unknown, it is called a "blind CSI measurement".

3. Data assisted pilot based CSI measurement: The CSI is basically measured by using the pilots, and the traffic data are used instead of the pilots according to variation of channels. This has been suggested because the overhead may relatively increase as compared with traffic data if the pilot is continuously used when variation of the channel is severe.

Hereinafter, an operation of a CSI encoder 125 will be described with reference to FIG. 2.

Figure 2:
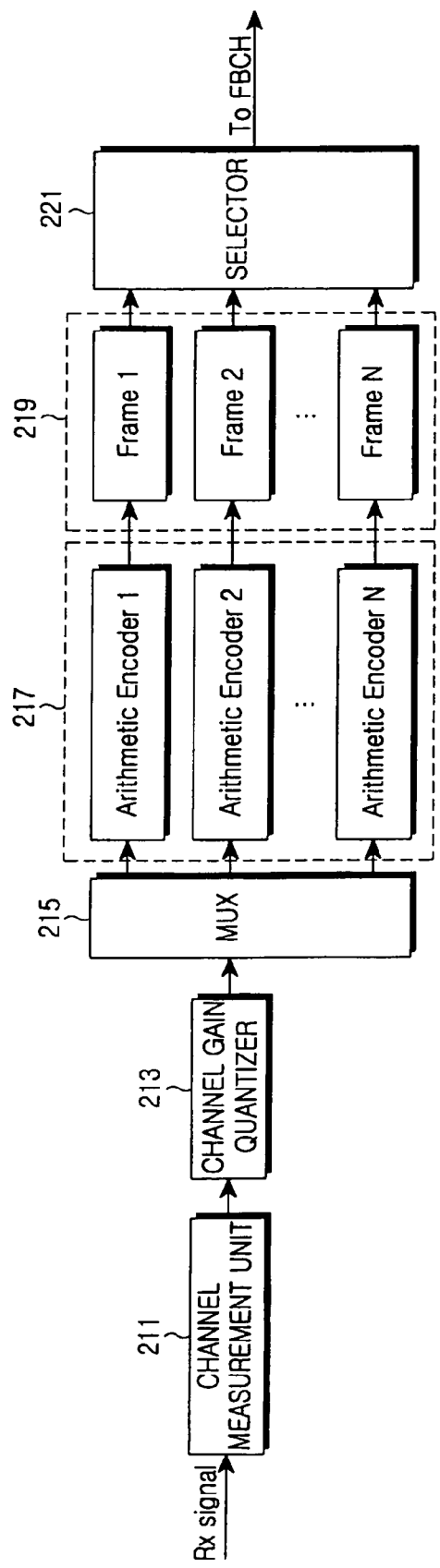
FIG. 2 is a flow diagram illustrating a structure of a channel state information encoder using arithmetic coding according to an embodiment of the present invention.

FIG. 2 shows a structure of the CSI encoder based on a filter bank of arithmetic encoders. Each arithmetic encoder matches with one of several typical channel models.

The CSI encoder is a filter bank made of N arithmetic encoders, each of which matches with one of the typical mobile channel conditions. For example, one can have 4 encoders corresponding to Fixed, Pedestrian, Urban mobile, Highway mobile, Fast train, etc.

Referring to FIG. 2, the CSI encoder based on the filter bank of arithmetic encoders includes a channel measurement unit 211 for measuring the CSI from an input signal, a channel gain quantizer 213 for quantizing each channel gain based on a measurement value of the CSI, a multiplexer 215 for multiplexing an output of the channel gain quantizer 213, N arithmetic encoders 217 for compressing the CSI by using arithmetic coding, N frames 219 for converting compressed CSI data into CSI feedback channel frames, and a selector 221 for selecting the CSI feedback channel frame having a predetermined compression rate corresponding to a channel environment from among the CSI feedback channel frames.

The CSI encoder having the above construction operates as follows:

First, the channel gain is measured on per sub-carrier (per tone) basis by the channel measurement unit 211. The present invention is not concerned with the details of such measurement, so it will not be further described below. However, it is noted that the CIS coding scheme of the present invention is consistent with any such channel measurement scheme.

In addition, channel gains measured by each sub-carrier are mapped into a finite set (finite alphabet) by the channel gain quantizer 213. Since the channel gain quantizing is carried out, the channel gains are mapped into the finite set. The finite set is generally called "finite alphabet" in a communication system. The quantized gain values are chosen to reflect SINR thresholds of the adaptive coding/modulation schemes used by the recipient of the feedback channel.

Then, the multiplexer 215 takes an input stream of the per sub-carrier channel gains quantized by the channel gain quantizer 213 and multiplexes the input stream so as to transmit streams to the N arithmetic encoders 217. That is, the multiplexer 215 produces N streams in parallel which are offered as an input to the N arithmetic encoders 217.

Then, the arithmetic encoders 217 (1 through N) perform data stream compression based upon their respective channel models and form FBCH frames. At this time, the frames 219 from different arithmetic encoders have different lengths.

The selector 221 selects the frame having the shortest length and sends it over on the FBCH.

The details of arithmetic encoding/decoding operations can be found in "Information Theory, Inference, and Learning Algorithms" written by David MacKay in 2003. In addition, implementation, specific details and optimizations of the arithmetic encoding/decoding operations are disclosed in "Numerical Recipes in C" written by William H. Press, Saul A. Teukolsky, William T. Vetterling and Brian P. Flannery in 1992, and "Arithmetic Coding Revisited" written by Alistair Moffat, Radford M. Neal and Ian H. Witten in 1998. The arithmetic encoding/decoding operations are beyond the scope of the present invention, so they will be omitted. However, it is noted that the present invention applies the arithmetic coding/decoding to a communication system in such a manner that the CSI can be transmitted to the FBCH while being compressed with a predetermined compression rate depending on the channel state, thereby ensuring the integrity of the CSI.

Each constituent channel model results in a Markov-type state machine which defines the set of probabilities of channel state transitions. According to the present invention, the channel state can be recognized by using the set of probabilities of channel state transitions. Thus, the compression rate for the CSI is decreased under a superior channel condition and is increased under an inferior channel condition.

Hereinafter, state transitions from one sub-carrier to another in the frequency domain will be described. In a very similar fashion, one can also consider the state transitions in a time domain.

This idea can be illustrated by a simple construction which specifies the likelihood of the sub-carrier channel gain between the current OFDM tone and the next OFDM tone. In this simple model, the gain of the next OFDM tone can differ from the current tone gain by 0 dB, ±1 dB, ±2 dB, and ±3 dB. The probability of gain jumps by more than 3 dB are considered unlikely, and therefore neglected. Table 1 illustrates the probabilities of such channel state transitions.

TABLE 1

| Channel Gain Change (dB) | Transition Probability |
|---|---|
| 0 | 0.9 |
| 1 | 0.03 |
| 2 | 0.015 |
| 3 | 0.005 |
| −1 | 0.03 |
| −2 | 0.015 |
| −3 | 0.005 |

As shown in Table 1, the numbers in the above Table 1 are for illustration only. The actual values of transition probabilities should be determined for each class of channel model by explicit simulations.

As known from the above-mentioned documents, arithmetic codes can achieve the optimum compression rate (source entropy) if the encoder uses the true probabilities found in the actual in/out sequence. Unfortunately, it is not possible to implement a separate encoder for each and every possible multipath scenario and channel condition.

For this reason, the present invention relies upon a statistically relevant set of channel models built in the filter bank as shown in FIG. 2. Each encoder comes with its own set of transitions and their respective probabilities. Out of all constituent encoders in the filter bank, the encoder which matches with the best input CSI sequence will have the best compression performance. In addition, according to the present invention as mentioned above, all the constituent encoders are aligned in parallel to each other according to a practical algorithm, and the encoder which produces the shortest encoded sequence is selected.

Hereinafter, the feedback channel frame format according to one embodiment of the present invention will be described with reference to FIG. 3.

Figure 3:
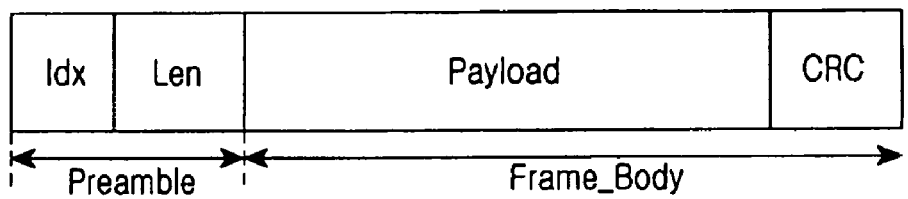
FIG. 3 is a view illustrating a feedback channel frame format according to an embodiment of the present invention.

FIG. 3 illustrates the feedback channel frame format according to one embodiment of the present invention.

Referring to FIG. 3, the number of uncoded quantized CSI gain symbols is equal to the number of sub-carriers (e.g. OFDM tones), which is a fixed number. The number of ARC compressed bits, on the other hand, changes from one frame to another because the compression factor is not constant. That is, the number may flexibly vary. Therefore, the present invention proposes an FBCH frame format having a flexibly variable length.

As shown in FIG. 3, the FBCH frame consists of a preamble and a frame body. In turn, the preamble consists of at least two fields, that is an Idx field having compression rate information (hereinafter, referred to as Idx) and a length field (Len) having compression rate check information. The frame body includes a payload field having compressed feedback information and a cyclic redundancy check (CRC) field for checking an occurrence of error. The Idx field labels a constituent ARC encoder produced by the frame shown in FIG. 2 and the length field contains the length of the frame body (Payload+CRC). The CRC is optional. Depending upon a specific multiple access scheme, other extra fields can be added to the preamble.

Hereinafter, a structure of the CSI decoder using arithmetic coding in the transmitter terminal 110 according to one embodiment of the present invention will be described with reference to FIG. 4.

Figure 4:
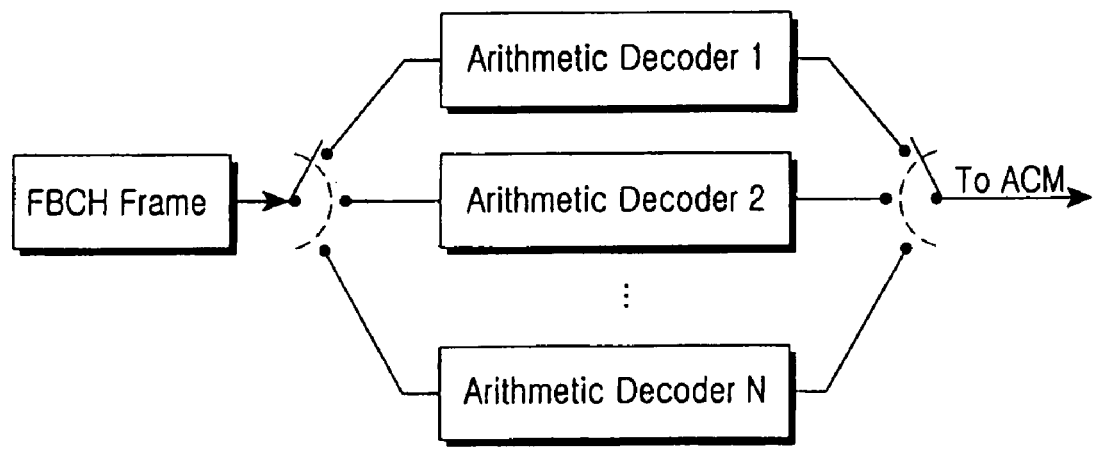
FIG. 4 is a block diagram illustrating a structure of a channel state information decoder using arithmetic coding according to an embodiment of the present invention.

FIG. 4 is a block diagram illustrating the structure of the CSI decoder using arithmetic coding according to one embodiment of the present invention.

First, the CSI decoder shown in FIG. 4 operates using the same filter as the CSI encoder. At any given time, only one arithmetic decoder Idx is active. The Idx is taken from the Idx of the feedback preamble shown in FIG. 3.

Referring to FIG. 4, based upon the Idx field in the preamble, the encoded CSI stream is being directed to an appropriate arithmetic decoder in the filter bank identical to the one in the receiver terminal 120. The decoded and quantized set of per sub-carrier CSI channel gains is passed further to the adaptive coding modulation subsystem of the transmitter terminal 110 for further utilization.

The details of arithmetic encoding/decoding operations can be found in "Information Theory, Inference, and Learning Algorithms" written by David MacKay in 2003. In addition, implementation, specific details and optimizations of the arithmetic encoding/decoding operations are disclosed in "Numerical Recipies in C" written by William H. Press, Saul A. Teukolsky, William T. Vetterling and Brian P. Flannery in 1992, and "Arithmetic Coding Revisited" written by Alistair Moffat, Radford M. Neal and Ian H. Witten in 1998.

Hereinafter, arithmetic encoders and operations thereof used for the apparatus and method for CSI feedback using arithmetic coding according to one embodiment of the present invention will be described with reference to FIG. 5.

Figure 5:
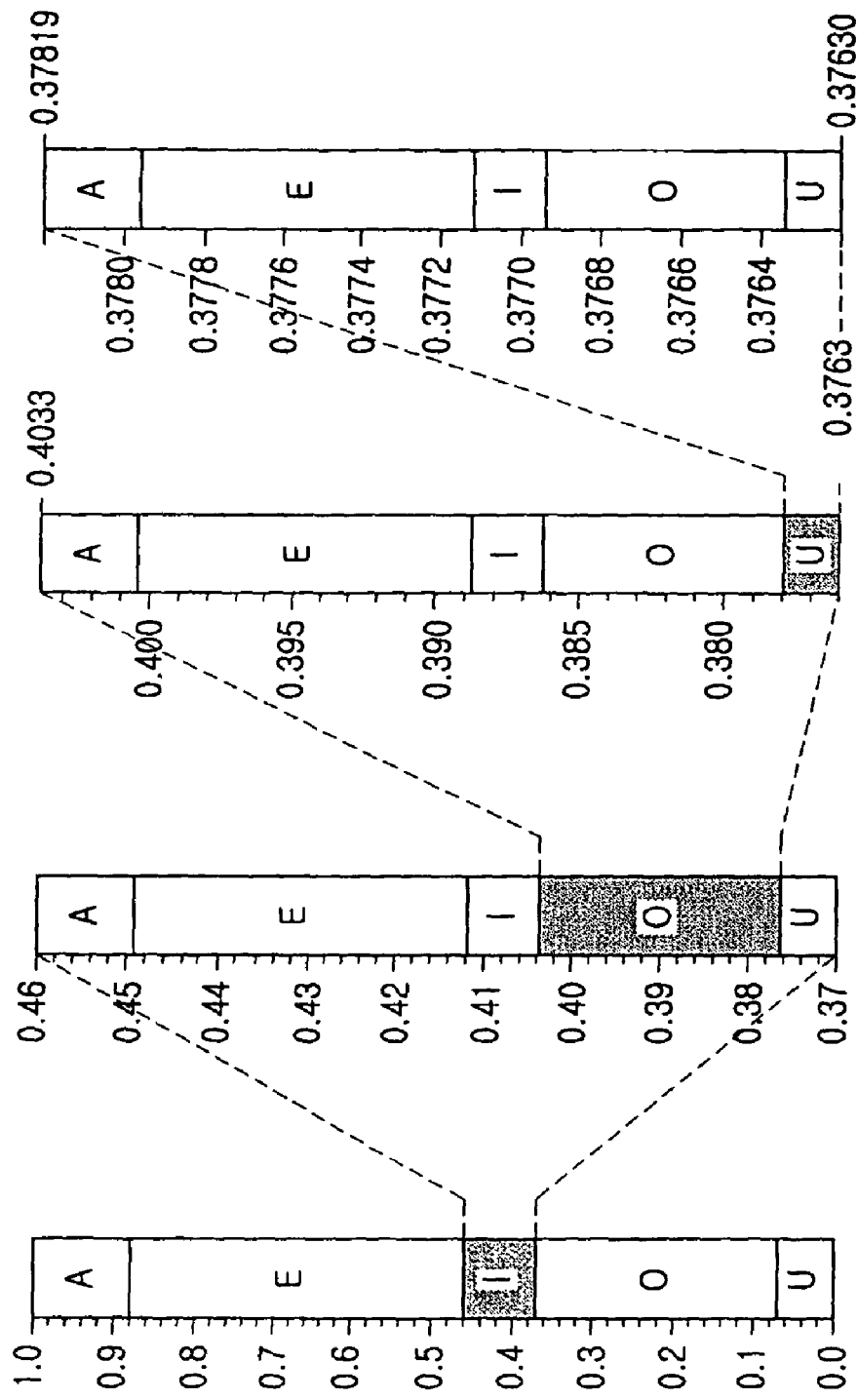
FIG. 5 is a view for explaining arithmetic encoders according to an embodiment of the present invention.

FIG. 5 is a view for explaining arithmetic encoders according to one embodiment of the present invention and showing progressive interval subdivision as new input symbols arrive.

Prior to explaining FIG. 5, it is noted that A, E, I, O, and U shown in FIG. 5 represent alphabetic vowel letters for showing one example of the arithmetic coding. For example, the alphabetic vowel letters are found from an article of a newspaper. In most articles, probabilities of A and E are predetermined. Referring to FIG. 5, the probability of A is about 12% (length of A-bar) and the probability of E is about 42% (length of E-bar).

In detail, as the alphabetic vowel letters are sequentially represented in the article, regions corresponding to the alphabetic vowel letters are selected. When the final vowel letter has been represented, a binary value is mapped into the corresponding final region. The binary mapping procedure will be described later with reference to FIG. 6. In the meantime, the largest region is assigned for the frequently represented vowel letter, thereby shortening a length of a final binary value.

Specifics of the arithmetic coding and relevant optimization used to improve its performance extensively covered in the above-mentioned documents. Thus, the drawing and description thereof described below are specific examples for emphasizing the fact that the arithmetic code is a variable-length stream.

First, the arithmetic code operates on strings of symbols from a finite alphabet ($a \in A$) of symbols. These symbols could be power control commands of various magnitude (0, ±1, ±2, . . . dB). In addition, the source generates the input symbols according to some known probability distribution $p(a)$ which can depend on the symbols generated previously (in other words, memory effects easily accounted for).

The arithmetic encoder starts with a unit interval [0, 1] and with each input symbol the interval is partitioned according to known probability distribution $p(a)$.

Figure 6:
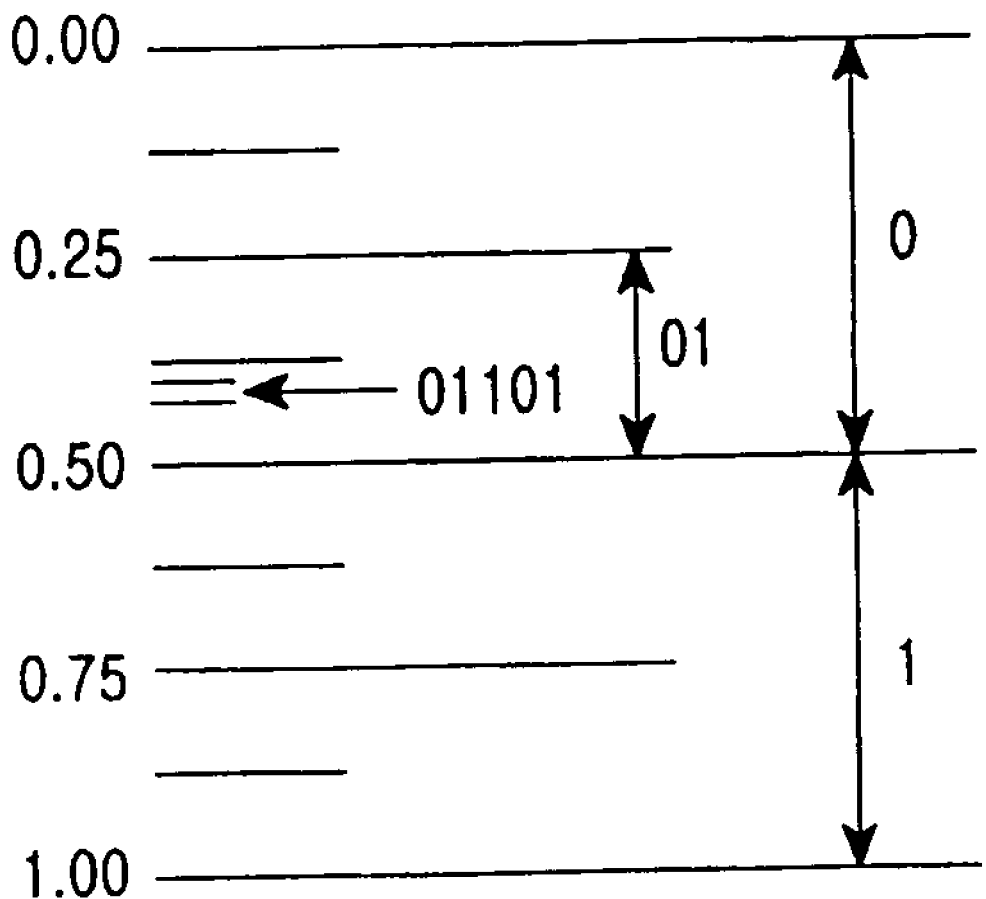
FIG. 6 is a view illustrating binary strings specifying unique interval partitioning in accordance with an embodiment of the present invention.

The intervals resulting from FIG. 5 can be interpreted in a binary representation as shown in FIG. 6.

FIG. 6 is a view illustrating binary strings specifying unique interval partitioning. Referring to FIG. 6, the resulting binary code is the shortest binary string that specifies an interval that lies entirely inside the interval obtained from the partitioning procedure. The details are shown in Table 2.

TABLE 2

| Symbol | Probability | Probability (in binary) |
| --- | --- | --- |
| n | 7/8 | 0B0.111 |
| U | 1/16 | 0B0.0001 |
| D | 1/16 | 0B0.0001 |

As shown in Table 2, the Table 2 shows the probability for each symbol and the binary representation for the probability, wherein n represents No-Change, U represents Up-command, and D represents Down-command. The Table 2 considers the alphabet of three power control commands and is combined with No-Change (n), Up-command (U), and Down-command (D) which are related to probability.

As described above, according to the apparatus and method for CSI feedback using the arithmetic coding of the present invention, the CSI is transmitted while being compressed with various compression rates according to the channel state by using the arithmetic coding, so the effects of the imperfect CSI upon system capacity can be significantly reduced, thereby improving system performance. In addition, the present invention applies the arithmetic coding/decoding to a communication system in such a manner that the CSI can be transmitted to the FBCH while being compressed with a predetermined compression rate depending on the channel state, thereby ensuring the certainty of the CSI and improving system efficiency.

Since the ACM multi-carrier broadband wireless communication system also requires the CIS feedback, the present invention is applicable for the 4G mobile communication system, while reducing costs required for the improvement of system performance and system equipment.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for feedback of Channel State Information (CSI) in a wireless communication system performing channel estimation at a transmitter or a receiver by using a pilot channel, the apparatus comprising:
   a transmitter terminal transmitting a signal for CSI measurement using the pilot channel; and
   a receiver terminal receiving the signal for CSI measurement from the transmitter terminal, checking a channel state based on the received signal, compressing CSI data using a compression rate according to the channel state, and transmitting the compressed CSI data,
   wherein the receiver terminal includes a receiver for receiving data using a traffic channel from the transmitter terminal and for receiving the signal for CSI measurement using the pilot channel from the transmitter terminal, a CSI measurement unit for measuring CSI data representing the channel state using the pilot channel, and a CSI encoder for compressing the CSI data into CSI feedback channel frames, and
   wherein the CSI encoder includes arithmetic encoders for compressing the CSI data using arithmetic coding, frame sections for converting the compressed CSI data into the CSI feedback channel frames, and a selector for selecting a CSI feedback channel frame having a selected compression rate from among the CSI feedback channel frames.

2. The apparatus of claim 1, wherein the transmitter terminal transmits the data to the receiver terminal using the traffic channel and transmits the signal for CSI measurement using the pilot channel.

3. The apparatus of claim 1, wherein the receiver terminal decodes the data transmitted thereto from the transmitter terminal, and sends the CSI feedback channel frames back to the transmitter terminal.

4. The apparatus of claim 1, wherein the arithmetic encoders perform the compressing based upon a channel model and the CSI feedback channel frames.

5. The apparatus of claim 1, wherein the selector selects a shortest frame from among the CSI feedback channel frames having different lengths and sends a shortest frame over on a feedback channel.

6. The apparatus of claim 1, wherein outputs of all the arithmetic encoders are matched to best input CSI sequences representing best compression performances.

7. The apparatus of claim 1, wherein the CSI encoder comprises a filter bank including N arithmetic encoders.

8. The apparatus of claim 1, wherein the arithmetic encoders are aligned in parallel to each other.

9. The apparatus of claim 1, wherein the selected CSI feedback channel frame includes a preamble and a frame body, the preamble including an Idx field representing the compression rate and a length field having check information of the compression rate and the frame body including a payload field having the compressed CSI data and a cyclic redundancy check field for checking an error of the compressed data rate.

10. The apparatus of claim 1, wherein the transmitter terminal includes:
    a transmitter for transmitting the data using the traffic channel and for transmitting the signal for CSI measurement using the pilot channel; and
    a CSI decoder for receiving and decoding the compressed CSI transmitted thereto from the receiver terminal.

11. The apparatus of claim 10, wherein the CSI decoder includes arithmetic decoders corresponding to the arithmetic encoders of the CSI encoder, wherein one of the arithmetic decoders operates for decoding the compressed CSI data.

12. A method for feedback of Channel State Information (CSI) in a wireless communication system performing channel estimation at a transmitter or a receiver by using a pilot channel, the method comprising the steps of:
    transmitting, by a transmitter terminal, data using a traffic channel and a signal for CSI measurement using the pilot channel;
    receiving, by a receiver terminal, the data using a traffic channel from the transmitter terminal and the signal for CSI measurement using the pilot channel from the transmitter terminal;
    checking, by the receiver terminal, a channel state based on the received signal for CSI measurement;
    compressing, by the receiver terminal, CSI data using arithmetic coding based on a compression rate according to the channel state;
    converting, by the receiver terminal, the compressed CSI data into CSI feedback channel frames;
    selecting, by the receiver terminal, a CSI feedback channel frame having a selected compression rate from among the compressed CSI feedback channel frames; and
    transmitting, by the receiver terminal, the selected CSI feedback channel frame.

13. The method of claim 12, wherein the data transmitted from the transmitter terminal are decoded, and the selected CSI feedback channel frame is transmitted back to the transmitter terminal.

14. The method of claim 12, wherein compressing the CSI data is performed based upon a channel model and the CSI feedback channel frames.

15. The method of claim 12, wherein a shortest frame is selected from among the CSI feedback channel frames having different lengths and the shortest frame is sent over a feedback channel.

16. The method of claim 12, wherein the arithmetic coding is performed by a plurality of arithmetic encoders, and outputs of all the arithmetic encoders are matched to best input CSI sequences representing best compression performances.

17. The method of claim 12, wherein the arithmetic coding is performed by a plurality of arithmetic encoders, which are aligned in parallel to each other.

* * * * *